No. 882,016. PATENTED MAR. 17, 1908.
G. W. PHILLIPS.
LAWN BOOT.
APPLICATION FILED AUG. 26, 1907.
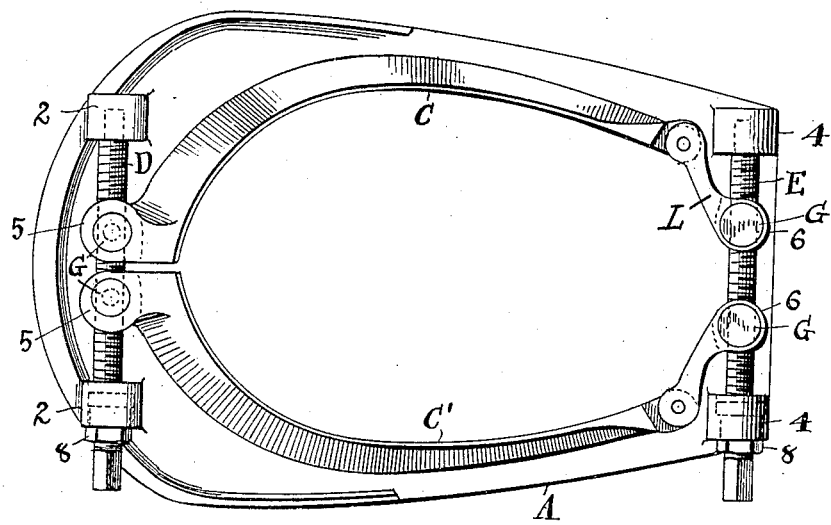
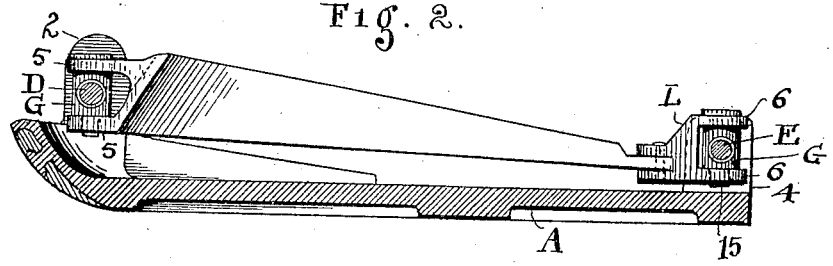
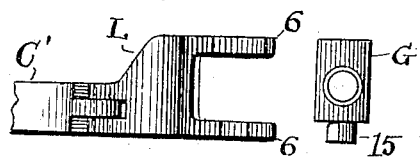
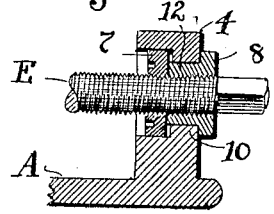
WITNESSES:
E. M. Fisher
F. C. Mussun
INVENTOR.
George W. Phillips
BY
Fisher & Mort
ATTORNEYS

UNITED STATES PATENT OFFICE.

GEORGE W. PHILLIPS, OF CLEVELAND, OHIO, ASSIGNOR TO THE PHILLIPS LAWN BOOT COMPANY, OF CLEVELAND, OHIO, A CORPORATION.

LAWN-BOOT.

No. 882,016.      Specification of Letters Patent.      Patented March 17, 1908.

Application filed August 26, 1907. Serial No. 390,239.

*To all whom it may concern:*

Be it known that I, GEORGE W. PHILLIPS, a citizen of the United States, residing at Cleveland, in the county of Cuyahoga and State of Ohio, have invented certain new and useful Improvements in Lawn-Boots, and do declare that the following is a full, clear, and exact description of the invention, which will enable others skilled in the art to which it appertains to make and use the same.

My invention relates to lawn boots, and the invention consists in a boot which has a substantially flat closed bottom or pad rounded at the edge to protect the lawn, and is provided with a pair of side clamping members adjustable laterally at both ends and adapted to fasten the pad upon the foot, all substantially as shown and described and particularly pointed out in the claims.

In the accompanying drawings, Figure 1 is a plan view of the boot complete, and Fig. 2 is a longitudinal sectional elevation thereof. Fig. 3 is a side elevation of one of the rear connecting members and a portion of a side member pivoted therein and a detail of one of the cylindrical connecting nuts adapted to be seated in said member. Fig. 4 shows the means for confining the screw rods rotatably in their bearings or parts.

A represents the pad or bottom of the boot, preferably of aluminium for lightness and provided with four posts, 2 and 2, and 4 and 4, respectively, at front and rear, and spaced apart at each end relatively as shown. Any preferred configuration may be given to the lower side of the pad to prevent slipping, and a depression is preferably formed in the middle and top of the pad beneath the more tender portion of the foot.

Two hoof clamps, C and C', are provided for locking the pad upon the hoof or foot of the horse, and said clamps are engaged at their respective ends directly or indirectly by right and left threaded screw rods D and E, respectively, rotatably supported at their ends in posts 2 and 4. One half of each of said rods from the middle is threaded to the right and the other half to the left, and cylindrical nuts G are mounted on rod D between ears 5 on the front ends of hoof clamps C C', and in corresponding ears 6 in or on the rear connecting links L. Said links L are pivotally engaged with the rear ends of clamps C C' and extend inward therefrom toward each other more or less and are operatively engaged upon said nuts with screw rod E passing through the center of the nuts. A slight pivotal accommodation of links L on said nuts, front and rear, is provided for to meet requirements in securing the boot on the foot and in removing the same.

One end of each screw rod projects and is squared to apply a wrench to turn the same, and each rod is confined lengthwise in its posts by means of two lock nuts 7 and 8 threaded on said screws respectively and located in one of the respective posts 2 and 4. Such post has a collar 10 as to which nuts 7 and 8 are oppositely arranged, while nut 8 has a tubular extension 12 of slightly greater depth than said collar engaged by nut 7, so that said nuts can bear tightly against each other and yet have free rotation as to collar 10. This confines said screw rods in their respective post bearings and yet provides for the separation and removal of all the parts, if necessary, the nuts 7 and 8 allowing this to be done.

The clamps C and C' are adjustable toward and from each other through said nuts G mounted on the right and left hand threads respectively of or on screws D and E, and the rotation of said screws in one direction will carry said clamps apart, and in the opposite direction will carry them together or toward each other. Hence said clamps are easily released, and when put on are spread to insert the foot from above, after which both screws are turned until the pad is firmly fixed upon the foot. The links or joint members L at the rear enable such adjustments to be made in comparatively close relations on rod E while the rear ends of the hoof clamps are relatively far apart laterally, as shown.

Each nut G has a bearing nipple or projection 15 at its bottom seated respectively in the lower lip or flange 5 and 6 respectively front and rear, while the upper corresponding lip has a hole large enough to accommodate the full size of the top of the nut.

What I claim is:—

1. A lawn pad for horses, having posts front and rear and right and left threaded screws rotatably supported in said posts, nuts engaging said right and left threads on each screw, and clamps to fasten the pad on the foot mounted on said nuts.

2. A lawn pad for horses, having posts at their ends and right and left threaded screws in said posts, a pair of cylindrically shaped nuts on each screw on said right and left threads respectively, and clamps for the foot mounted on said nuts in rotatable relation thereto, whereby adjustment can be made at either end.

3. The pad having posts on top front and rear, right and left threaded screws rotatably mounted in said posts, a pair of oppositely threaded nuts on each screw, a pair of clamping members to secure the pad to the foot mounted at their front ends directly upon the front nuts, and links connecting the rear ends of the clamps with the rear nuts.

4. The pad having front and rear posts on top, oppositely threaded screws in said posts and clamps for the foot adjustably mounted on said screws, and lock nuts for said screws rotatably confined in both said front and rear posts respectively.

5. A lawn pad for horses having two posts at its front and two at its rear, a single screw mounted in each set of said posts having right and left threads, respectively, between said posts, and separate clamping members adapted to engage the hoof adjustable upon said threads toward and from each other.

In testimony whereof I sign this specification in the presence of two witnesses.

GEORGE W. PHILLIPS.

Witnesses:
R. B. MOSER,
F. C. MUSSUY.